Figure 1:
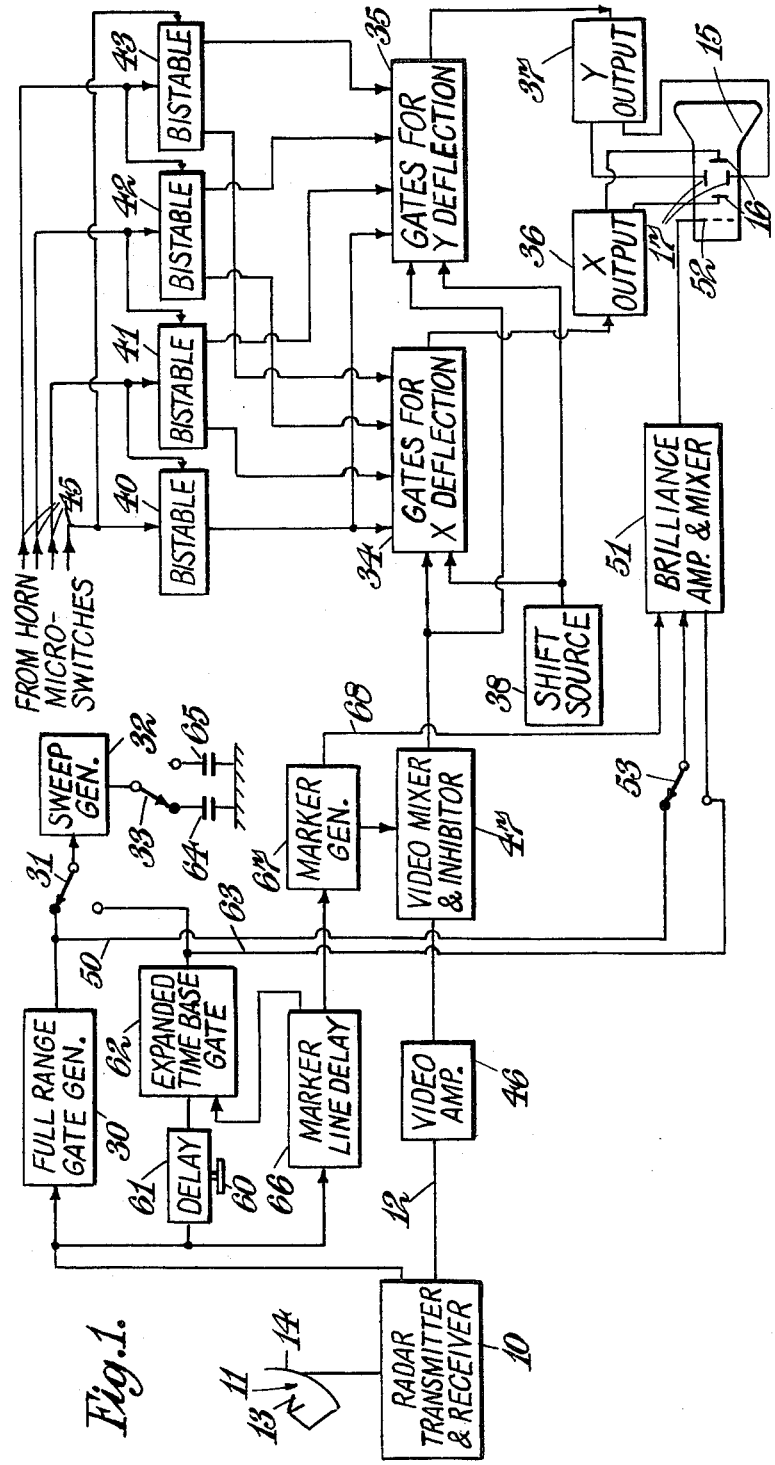

Sept. 14, 1965    A. P. TUTHILL    3,206,750
RADAR DISPLAY APPARATUS
Filed March 28, 1963    2 Sheets-Sheet 2
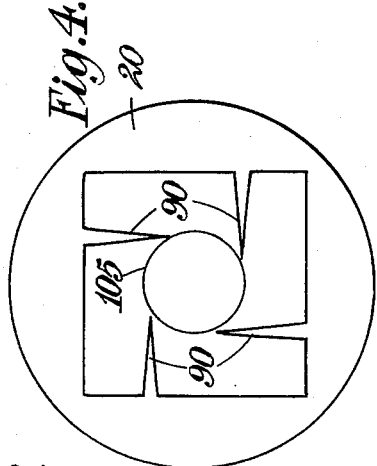
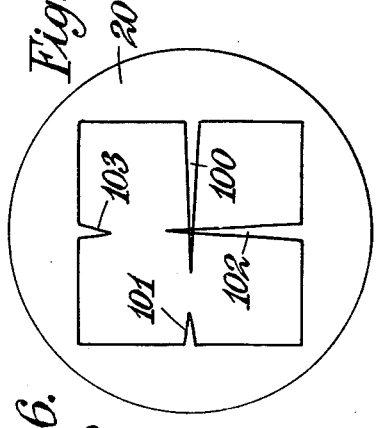
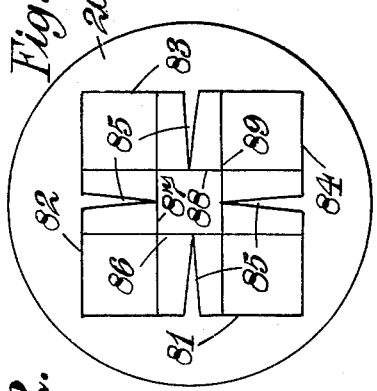
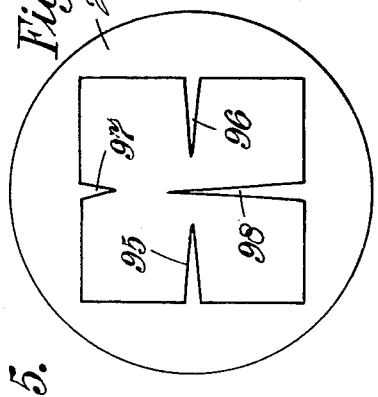
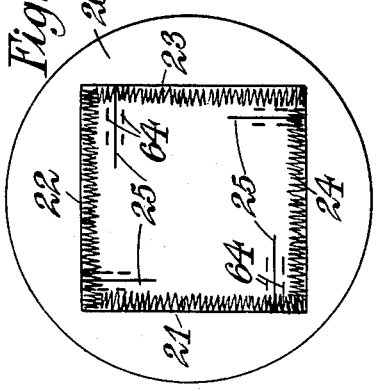
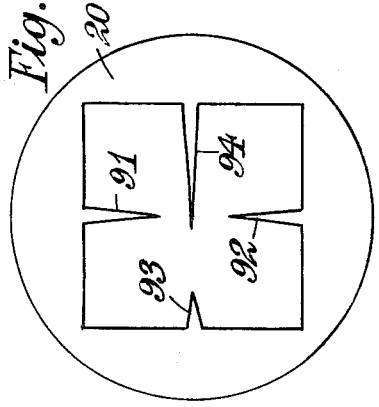

United States Patent Office 3,206,750
Patented Sept. 14, 1965

3,206,750
RADAR DISPLAY APPARATUS
Anthony Peter Tuthill, London, England, assignor to Decca Limited, London, England, a British company
Filed Mar. 28, 1963, Ser. No. 268,647
Claims priority, application Great Britain, Mar. 29, 1962, 12,083/62
4 Claims. (Cl. 343—11)

This invention relates to display apparatus for pulse radar systems using conical scanning of a transmitted and/or receiving directional beam or having four overlapping beams offset from a line to the target in quadrantal directions.

Conical scanning systems for radar are well known. In such a system when the aerial is correctly aligned on the target, the direction of maximun gain of the transmitted and/or receiving beam is along a line offset from direct line from the aerial to the target by a small angle and the beam is rotated about this direct line from the aerial to the target so that the beam describes a conical pattern. The beamwidth is such that when the aerial is directed onto the target, a response is obtained through the full circle of rotation of the beam. If the aerial is not correctly aligned the amplitude of the response will vary cyclically with the rotation of the beam. Such systems are employed for example if a target is to be tracked, e.g. in a wind-finding radar where a target consisting of a balloon or a reflector on a balloon has to be tracked. Various methods have been proposed in the past for display information from conical scanning systems. For example one well-known method is to use a display having two expanded traces with deflection modulation, the traces being on separate cathode ray tubes. By an expanded trace is meant a trace starting at some suitable time interval after the transmission of the radar pulse and extending for a time period which is quite small compared with the time period for a radio signal to travel from the radar to the target and back. By control of the starting time of such a trace, a target response can be centered on the trace and such an arrangement therefore is very convenient for range following since an adjustable range control, for example a rotatable wheel with a calibrated scale in the case of a manual following device, can be adjusted until the target echo appears at the middle of the expanded trace. For a conical scanning system, the two expanded traces have heretofore been employed on separate cathode ray tubes, one of the traces being vertical and having deflections to the left and to the right obtained from and representing respectively the signals received when the aerial beam is on the left and right-hand sides of the conical scan of the beam and the other trace being horizontal with deflections up and down, these deflections being obtained from and representing respectively the signals when the aerial is at the top and bottom of the conical scan. In such a display system the range control is adjusted until the echoes appear at the center of the expanded traces, the azimuth control is adjusted until the echoes on the vertical trace are of equal amplitude and the elevation control is adjusted until the echoes on the horizontal trace are of equal amplitude. Such an arrangement employing two cathode ray tubes with three controls to be adjusted however is not particularly convenient for radar apparatus being operated by a single operator who is trying to follow in range, azimuth and elevation simultaneously. To facilitate tracking by a single operator it has been preferred in the past to make use of a cathode ray tube display on a single tube with a radial trace which is rotated in synchronism with the rotation of the beam, the trace being a time base trace which is brightness modulated by received echoes. Thus when the aerial is directed at the target, the echo appears as a circle on the screen of the tube with a radius corresponding to the range of the target. If the aerial is not correctly aligned on the target, the circle will have a gap in it, the angular extent of which will increase with increasing misalignment. The position of the gap with respect to the center of the display will indicate the direction of the misalignment. Such arrangements however suffer from the disadvantage that, due to the small dynamic range within which brightness modulation of the cathode ray tube screen is possible, the system is not very sensitive for determining misalignment of the aerial and the operator cannot detect misalignment until it has exceeded some appreciable angle.

Although conical scanning systems have been more particularly described, it will be apparent that the same problem of comparing echo responses from different beam directions arises in a system having four overlapping beams offset from the target line. It is an object of the present invention to provide an improved form of display facilitating the operation by a single operator.

According to this invention, in radar display apparatus for use with pulse radar having a conical scanning system, or having four overlapping beams offset from a target line in quadrantal directions there is provided a display system with four time base traces for displaying responses received in the same selected time period after the transmitted pulse, the four traces being spaced evenly around a datum point, conveniently the center point, on a display screen and the traces being deflection modulated so that the responses from a target are directed inwardly towards the opposite trace, the four traces being modulated with signals obtained from the appropriate quadrantal arcs. Preferably expanded time base traces are employed so that, when the range setting for the traces is adjusted so that the target response is central on the expanded traces, the responses are directed inwardly towards said datum point. The four traces might be portions of circular arcs centered on the datum point (such as would be produced using a circular time base producing system) but most conveniently they are straight line traces forming the sides or parts of the sides of a square centered on the aforementioned datum point. In general it will be convenient to have top and bottom horizontal traces and left and right vertical traces modulated with signals obtained from the beam when passing through the appropriate top and bottom and left and right quadrantal arcs in the case of a conical scanning system or from the corresponding beams in a four beam system. Assuming expanded time base traces are employed, provided the range following is correct, the four responses on the four traces will be centered on these traces and will therefore be directed inwardly to the datum point and, if the elevation following is correct, the top and bottom responses will be of equal magnitude and, if the azimuth following is correct, the left and right responses will be of equal magnitude. Any error in elevation tracking will produce unequal responses on the top and bottom traces whilst error in azimuth tracking will produce unequal responses in the left and right traces. The sense of the error is immediately apparent by noting which trace of a pair has the bigger response. Comparison of the magnitude of the responses may be facilitated by providing marker lines, e.g. a circle or a square marker, around the datum point on the screen. It will be seen therefore that the observer now has to direct his eye to the center point of the screen and by viewing the tips of the four responses he can immediately see if there is any error in azimuth or elevation following on by locking for any asymmetry of the tips of the responses with respect to the datum point. Range errors will be apparent by movement of the responses along the expanded time base traces. Most conveniently the four time bases are arranged so that the time scales of opposite time bases extend in opposite directions; for example the left-hand trace may move from top to bottom whilst right-hand trace moves from bottom to top and in this case preferably the top trace moves from right to left and the bottom trace left to right so that an increase in range will give an apparent anti-clockwise movement of the tips of all four responses.

In a conical scanning system the four traces may be produced in sequence synchronized with the conical scanning rate. In a four beam system, however, the signals are available simultaneously on all four beams. It would be possible to switch a single receiver in sequence synchronized with sequential display traces but, to avoid loss of radar data, four receiving channels may be employed, one for each beam, and the signals displayed simultaneously using a four gun display tube.

To assist in range following, intensity modulation may be applied to the expanded time base traces at the center points thereof so that, if the range following is correct, the peaks of the echo signals are brightness modulated to increase their intensity whilst if the target goes off in range, the bright spot will tend to move down one or other of the flanks of each response according to the direction of the error.

It will be apparent that range following is facilitated by using expanded time base traces although this is not essential; non-expanded time base traces might be employed with range measurement being effected by the use of range markers in the form of a movable bright spot or step or each trace. In practice it may be convenient to have the display switchable so that full range, non-expanded, display traces may be employed during target acquisition and expanded traces when following a target.

The following is a description of one embodiment of the invention reference being made to the accompanying drawings in which:

FIGURE 1 is a block diagram illustrating a radar apparatus with its display system; and FIGURES 2 to 7 are diagrams for explaining the appearance of the display screen using the radar apparatus and display system of FIGURE 1.

Referring to FIGURE 1, the radar transmitter and receiver are illustrated diagrammatically at 10 and, in accordance with conventional practice, may comprise a transmitter producing short duration pulses of microwave energy which are radiated from a directional aerial system 11. Echoes of the signals from distance targets are picked up by the aerial and detected by the receiver to provide a video signal output on a lead 12. The aerial system 11 has a horn 13 which is mechanically rotated about the axis of a parabolic reflector 14 to produce a conical scanning pattern about an axis which may be adjusted in elevation and bearing as required by appropriate angular movement of the whole aerial system 11. Radar apparatus of this kind is well known and no further description is believed necessary.

The present invention is more particularly concerned with the manner in which the radar information is displayed. There is provided a cathode ray display tube 15 with orthogonal deflector means illustrated diagrammatically as a pair of X-plates 16 and a pair of Y-plates 17 although electron magnetic deflection means may equally well be employed. Referring to FIGURE 2 which shows the appearance, in one form, of the radar display, the cathode ray tube screen is indicated by the circle 20 and, for target acquisition, the display is in the form of four straight line time bases 21, 22, 23 and 24 which form the four sides of a square. The time bases each have a duration corresponding to the full range over which targets are to be detected and will therefore be referred to as full-range time bases. The square formed by the four time bases is centered on a datum point which is conveniently the centre of the tube. The four time base sweeps are in the same angular sense about this datum point, in this particular arrangement being anti-clockwise so that the left-hand time base 21 extends from the top to the bottom of the figure, the top time base 22 extends from the right to the left, the right-hand time base 23 extends from the bottom to the top and the bottom time base 24 extends from the left to the right. The radar video signals are applied as a deflection modulation at right angles to the direction of the trace and inwardly towards the opposite side of the square. Thus noise signals appear as shown in FIGURE 2 along each of the time bases extending in a direction inwardly towards the opposite side of the square. FIGURE 2 also shows one target signal 25 which appears on each of the four time base traces almost at the full range.

Referring to FIGURE 1, a display trigger signal from the radar apparatus 10 synchronized with the radiated pulses triggers a full range time base gate generator 30 producing an output signal of the required duration of the full range time bases shown in FIGURE 2. This gate signal is fed via a switch 31 to a sweep generator 32 which generates a sawtooth waveform having a slope dependent on the setting of a switch 33 ganged with the aforementioned switch 31. This sawtooth waveform is fed to two gate units 34, 35 which control the application of the waveform via appropriate output stages 36, 37 to the X and Y deflector means of the cathode ray tube 15. To produce the left-hand time base 21 or the right-hand time base 23 the waveform is applied to the vertical deflector plates 17. For the left-hand time base 21 the sweep deflection would have to be downwardly whilst for the right-hand time base 23 it would be upwardly. During these time base deflections the appropriate shifts have to be applied to the X-plates to hold the traces in the required positions in the X direction. These shift voltages are derived from a stable direct voltage shift source 38 which is also fed into the aforementioned gates 34, 35 which would apply the appropriate shift signals to the X-plates during these time base periods. The same sawtooth voltage from the sweep generator 32 is also used for the horizontal top and bottom traces 22, 24 by applying the sawtooth voltage to the X-deflector plates with the appropriate shifts from the shift voltage source 38 to the Y-deflector plates. The control of the gates 34, 35 to give the required sequential switching of signals to the X and Y plates is effected by a sequence of four switching waveforms derived from four bi-stable units 40 to 43 which are interconnected so that as soon as each bistable unit in this series is switched to a state producing a control pulse for the gate units 34, 35 the preceding bi-stable in the chain is switched off. In this particular embodiment of the invention, scanning of the radar beam conically about the axis of the antenna assembly is effected by rotation of the horn feed 13 and microswitches are provided giving switching pulses corresponding to four quadrantal points at the top left, bottom left, bottom right and top right positions of the conical scan. These pulses are fed on leads 45 to the bi-stable devices 40 to 43 so causing these bi-stable devices to be switched in sequence at these points on the conical scan of the beam. Thus for example the bi-stable 40 will be switched to provide an input to the gate units 34, 35 during the time when the conical scanning is proceeding from the top left position to the bottom left position. Then the next pulse from a microswitch will switch on the bi-stable device 41 which will in turn switch off the bi-stable device 40. This sequence of operations continues cyclically so that the four bi-stable devices 40 to 43 are each operated in turn. These bi-stable devices provide the necessary switching signals for operating the various gates in the gate units 34, 35 so that the appropriate sweep and shift voltages are applied to the deflector means of the cathode ray tube. The video signals from the radar receiver output 12 are fed through a video amplifier 46 and a video mixer and inhibitor unit 47, to be described later, to the gate units 34, 35. When the time base sweep is applied in the Y direction the video signals are applied in the X direction and vice versa by the switching in the gate units 34, 35 so as to give deflections at right angles to the traces in accordance with the amplitudes of the video input signals. These deflections are in the inward direction towards the centre of the cathode ray tube so thereby producing the form of display shown in FIGURE 2. The output from the full range time base gate generator 30 is fed also through a lead 50 to a brilliance amplifier and mixer 51 to provide a brightening wave form which is applied to the grid 52 of the cathode ray tube 15 so that the trace is brightened for the period of each time base waveform. The lead 50 includes a switch 53 which is ganged with the aforementioned switches 31 and 33.

For determining the range of the target, there is provided a delayed trigger delayed by an amount adjustable by means of a range handwheel control 60 which controls the delay in a trigger delay unit 61 thereby providing a delayed trigger which is fed into an expanded time base gate generator 62 producing a gate signal corresponding to a selected short part of the full range trace. The range of the centre point of this gate signal is indicated by calibrations on a dial associated with a pointer on the handwheel control 60 or by other convenient means. The expanded time base gate generator provides a signal on a lead 63 which is fed into the brilliance amplifier and mixer 51 so brightening a short portion of each full range time base trace on the display. In FIGURE 2 there are shown dashed lines 64 on trace 21 and corresponding lines on each of the other traces indicating the portion of the trace which would be brightened if the range control 60 was set to the range of the target response indicated at 25. The range of the target can thus be measured by adjusting the position of this brightened portion of the trace by the control 60 so that the target echo appears in the center of this brightened portion; the calibrations on the control 60 then indicate the range.

Accurate range measurement and target following however is provided by the use of expanded time base traces which are illustrated diagrammatically in FIGURE 3. In this figure, as also in FIGURES 4 to 7 noise has been omitted for the sake of clarity. Four traces are again arranged to form a square with the traces 81, 82, 83 and 84 corresponding respectively to expanded portions of the traces 21, 22, 23 and 24 of FIGURE 2. In FIGURE 3, the expanded portions have been selected, by adjustment of the delays before the starts of the traces, so that the target response 85 appears in the center of each of the traces. These expanded time base traces are provided by using the gating signal from the expanded time base gate signal generator 62 (FIGURE 1) which for these traces, is fed via the switch 31 into the sweep generator 32. When the switch 31 is put in the position to feed signals from the expanded time base gate generator 62 into the sweep generator 32, the ganged switch 33 changes the time constant of the sweep generator, as indicated diagrammatically by switching from a capacitor 64 to a capacitor 65, and so changing the slope of the sawtooth waveform to that corresponding to the much faster sweep required for the expanded traces. Typically the expanded time base might have a duration of about one fiftieth of the full range time base. The ganged switch contact 53 now interrupts the circuit 50 so that the brightening signal is derived only from the lead 63 that is to say during the period of the expanded time base trace. The gate units 34, 35 control as before the sequential switching of the sweep, shift and video signals to the deflection means so producing the required four traces in the form of a square with echo signals effecting deflection inwardly as shown in FIGURE 3.

In FIGURE 3, there are shown four marker traces 86, 87, 88 and 89 in the form of straight line markers parallel to but displaced inwardly from each of the four traces 81, 82, 83 and 84. These marker traces are produced by means of a marker line delay unit 66 which provides a pulse after the end of each full range time base and hence after any expanded time base. This pulse from the marker line delay unit 66 is fed into a marker line generator unit 67 which feeds signals into the video mixer and inhibitor 47. This unit 47, in response to these signals, firstly inhibits the video from amplifier 46 and secondly substitutes a constant voltage from the marker line generator 67 for providing the necessary displacement of each marker line from its corresponding time base trace. The marker line delay signals are also fed into the expanded time base gate generator 62 so that, when the switch 31 is set to give an expanded time base display, the delayed trigger from the marker line delay unit 66 will cause the sweep generator 32 to provide a further fast time base sweep (after the display trace) which will appear on the cathode ray tube displaced from its normal position by the amount determined by the deflection set in from the marker line generator 67. This marker line generator also provides a brightening signal on a lead 68 which is fed into the brilliance amplifier and mixer 51 to provide the necessary brightening of the marker line traces.

It will be seen that the above described apparatus will operate to produce, for the whole period that the conical scan takes to traverse one quadrant, a succession of display traces, either full range traces or expanded time base traces depending on the switch setting. Thus, for the top quadrant of the scan the traces will be across the top of the display screen, and will occur in succession and, for an expanded time base, with a corresponding marker trace below the radar display trace. These traces will by synchronised with the radar pulses. When the conical scan reaches the next quadrant, in this case the left-hand quadrant, a succession of display and marker traces on the left-hand side of the screen will be produced. Subsequently the bottom traces and the right-hand traces will be similarly produced.

The apparatus of FIGURE 1 is used in the following manner. The ganged switches 31, 33 and 53 are set in the full range time base position so providing a display of the form shown in FIGURE 2. The aerial system 11 is aligned with its axis pointing approximately in the target direction so that, with the conical scanning, the amplitudes of the signals received in the four quadrants will be approximately equal as indicated in FIGURE 1. The range control 60 is then adjusted so that the expanded time base straddles the target response as indicated by the lines 64 of FIGURE 1. The switches 31, 33 and 53 are then changed to the expanded time base position and, if the aerial was exactly aligned on the target and the expanded time base controlled by the delayed trigger unit 61 was centered on the target range, the display would be of the form shown in FIGURE 3 with four target responses 85 pointing exactly towards the center of the display and all of equal amplitude. More generally however the aerial will not be exactly pointing at the target and the expanded time bases will not be exactly centered on the target response. FIGURE 4 shows the appearance of the display using expanded time bases when the target responses, as shown at 90, are not centralised on the traces. The target responses will each be displaced along its respective time base by the same amount in the same direction so that the display will be of the form shown in FIGURE 4 with none of the four target responses pointing towards the center of the display. The misalignment is readily recognized by the fact that the responses on opposite traces are not exactly opposite one another and the range control 60 is adjusted until these responses 90 are all pointing towards the center of the display. FIGURE 5 illustrates the form of the display when the range control 60 has been adjusted to bring the target responses to the centers of the expanded time bases but in which the aerial is misaligned in azimuth. It can be seen that in FIGURE 5 the target responses 91, 92 on the top and bottom traces are of equal amplitude showing that the aerial is correctly set in elevation and these target responses both point to the center of the display showing that the range control is correctly set. The responses 93, 94 on the left and right hand traces however are of unequal amplitude. The response 93 in this particular case is smaller than the response 94 showing that the aerial is aligned to the left of the target and this misalignment can be corrected by operation of the azimuth control of the aerial system. The aerial directional control may be effected in the known manner, for example by having separate azimuth and elevation controls manually operated to control servo mechanisms for driving the aerial or more conveniently using a single control of the joy-stick type to control servo drives for the aerial in both azimuth or elevation or by using a rolling ball resolver having a freely mounted ball (as is described in U.S. Patent No. 2,944,238) to control servo drives for the aerial in azimuth and elevation. FIGURE 6 illustrates the expanded time base display when the range control is correctly set but the aerial is misaligned in elevation but not in azimuth. In FIGURE 6 it can be seen that the responses 95, 96 on the right and left hand traces of equal amplitude showing the azimuth setting is correct but the response 97 on the upper trace is of smaller amplitude than the response 98 on the bottom trace thereby indicating that the aerial is pointing above the target. FIGURE 7 illustrates the form of the display when the aerial is misaligned in both azimuth and elevation. In FIGURE 7 the right-hand response 100 is greater than the left-hand response 101 illustrating misalignment to the left of the target whilst the bottom response 102 is greater than the top response 103 indicating that the aerial is pointing above the target.

The video output signals from the radar are preferably controlled by a slow automatic gain control so as to ensure that the peak signals are of such amplitude that, when the aerial is aligned they are close to the marker lines as shown in FIGURE 3.

On the expanded time base displays, intensity modulation signals of a duration about ¼ or ½ of the video pulse length may be applied to the radar display time base traces at the centers thereof. If the range following is correct the peaks of the signals will be brightened; if however there is any error in the range following, the bright spot will move down a flank of the echoes so clearly indicating the presence and the sense of any error in range following.

In FIGURES 4 to 7, the marker lines have been omitted for clarity; in FIGURE 4, however a circle marker trace 105 has been shown to indicate an alternative form of marker system which may be preferred in some cases. Such a circle marker may readily be produced by applying sinusoidal signals in phase quadrature to the X and Y deflection means.

Although an arrangement using conical scanning has been more particularly described, it will be readily apparent that an aerial system providing four overlapping directional beams evenly spaced about a datum direction, may equally well be employed. In such a case four separate receiving channels may be employed, the four video signals being switched in sequence to the display in synchronism with the sequential switching of the display traces or a four gun tube employed. Alternatively a single receiving channel may be connected to receive signals in sequence on the four beams.

I claim:

1. In a pulse radar apparatus transmitting short duration pulses and receiving echoes thereof with a conically scanning antenna system or with an antenna system radiating four overlapping beams offset from a target line in quadrantal directions; a display system comprising a cathode ray display tube having a display screen and having X and Y deflector means, time base generator means arranged to produce a linear sweep waveform, switch means for applying the sweep waveform selectively to the X or to the Y deflector means, a shift signal source, switch means for applying a shift signal from said shift signal source selectively to the X or Y deflector means, control means synchronized with the conical scan of the antenna system to control said switch means to apply the sweep waveform and shift signal in sequence to the deflector means synchronized with successive quadrantal movements of the conical scan to give four time base traces forming the four sides of a square, the time scales of all the time base traces being in the same sense around the center of the square, and deflection modulation means applying received radar responses as modulation signals to the deflector means to deflect each time base trace towards the instantaneous magnitude of the modulation signal, and means producing four marker traces in succession on said display screen comprising means producing a further sweep waveform and a further shift signal after each time base trace, control means arranged to apply said sweep waveform and said further shift signal to said deflector means during the period of the marker trace to cause each marker trace to be positioned parallel to but spaced inwardly from the preceding time base trace.

2. In a pulse radar apparatus transmitting short duration pulses and receiving echoes thereof with a conically scanning antenna system or with an antenna system radiating four overlapping beams offset from a target line in quadrantal directions; a display system comprising a cathode ray display tube having a display screen and having X and Y deflector means, time base generator means arranged to produce a linear sweep waveform, switch means for applying the sweep waveform selectively to the X or to the Y deflector means, a shift signal source, switch means for applying a shift signal from said shift signal source selectively to the X or Y deflector means, control means synchronized with the conical scan of the antenna system to control said switch means to apply the sweep waveform and shift signal in sequence to the deflector means synchronized with successive quadrantal movements of the conical scan to give four time base traces forming the four sides of a square, the time scales of all the time bases being in the same sense around the center of the square, and deflection modulation means applying received radar responses as modulation signals to the deflector means to deflect each time base trace towards the instantaneous magnitude of the modulation signal, and means applying intensity modulation signals having a duration less than the duration of the radar pulse signals to the time base traces at the centers thereof.

3. In a pulse radar apparatus transmitting short duration pulses and receiving echoes thereof with a conically scanning antenna system or with an antenna system radiating four overlapping beams offset from a target line in quadrantal directions; a display system comprising a cathode ray display tube having a display screen and having X and Y deflector means, time base generator means arranged to produce a linear sweep waveform, switch means for applying the sweep waveform selectively to the X or to the Y deflector means, a shift signal source, switch means for applying a shift signal from said shift signal source selectively to the X or Y deflector means, control means synchronized with the conical scan of the antenna system to control said switch means to apply the sweep waveform and shift signal in sequence to the deflector means synchronized with successive quadrantal movements of the conical scan to give four time base traces forming the four sides of a square, the time scales of all the time base traces being in the same sense around the center of the square, and deflection modulation means applying received radar responses as modulation signals to the deflector means to deflect each time base trace towards the instantaneous magnitude of the modulation signal, means applying intensity modulation signals having a duration less than the duration of the radar pulse signals to the time base traces at the centers thereof, and means producing four marker traces in succession on said display screen, comprising means producing a further sweep waveform and a further shift signal after each time base trace, control means arranged to apply said further sweep waveform and said further shift signal to said deflector means during the period of the marker trace to cause each marker trace to be positioned parallel to but spaced inwardly from the preceding time base trace.

4. In a pulse radar apparatus transmitting short duration pulses and receiving echoes thereof with a conically scanning antenna system or with an antenna system radiating four overlapping beams offset from a target line in quadrantal directions; a display system comprising a cathode ray display tube having a display screen and having X and Y deflector means, time base generator means arranged to produce a linear sweep waveform, switch means for applying the sweep waveform selectively to the X or to the Y deflector means, a shift signal source, switch means for applying a shift signal from said shift signal source selectively to the X or Y deflector means, control means synchronized with the conical scan of the antenna system to control said switch means to apply the sweep waveform and shift signal in sequence to the deflector means synchronized with successive quadrantal movements of the conical scan to give four time base traces forming the four sides of a square, the time scales of all the time bases being in the same sense around the center of the square, and deflection modulation means applying received radar responses as modulation signals to the deflector means to deflect each time base trace towards the instantaneous magnitude of the modulation signal, and means applying sinusoidal signals in phase quadrature to the X and Y deflector means respectively after each of said time base traces to produce a circle marker trace centered on the center of, and within, the square formed by the four time base traces.

References Cited by the Examiner
UNITED STATES PATENTS

| | | | |
|---|---|---|---|
| 2,300,189 | 10/42 | Wolff | 343—100 |
| 2,423,829 | 7/47 | Ferrell | 343—16 |
| 2,448,059 | 8/48 | Smith et al. | 343—16 |
| 2,453,711 | 11/48 | Isbister et al. | 343—13 |

CHESTER L. JUSTUS, *Primary Examiner.*